United States Patent [19]
Colangelo, Jr.

[11] Patent Number: 6,025,574
[45] Date of Patent: Feb. 15, 2000

[54] TRIGGER LOCKING PIN MECHANISM FOR MIG GUN

[75] Inventor: John F. Colangelo, Jr., Troy, Ohio

[73] Assignee: Illinois Tool Works Inc, Glenview, Ill.

[21] Appl. No.: 09/130,570

[22] Filed: Aug. 7, 1998

[51] Int. Cl.⁷ .............................. B23K 9/00; H01H 3/20
[52] U.S. Cl. ................... 219/137.31; 200/43.17
[58] Field of Search ................ 219/137.31, 137; 200/43.17

[56] References Cited

U.S. PATENT DOCUMENTS

| | | | |
|---|---|---|---|
| 3,132,227 | 5/1964 | Butler .................. | 200/43.17 |
| 3,379,852 | 4/1968 | Korshak ............... | 200/43.17 |
| 3,971,906 | 7/1976 | Sahrbacker ........... | 200/43.17 |
| 4,097,703 | 6/1978 | Houser ................. | 200/157 |
| 4,097,705 | 6/1978 | Harvell ................ | 200/157 |
| 4,250,366 | 2/1981 | Erickson et al. ....... | 200/157 |
| 4,403,136 | 9/1983 | Colman ............... | 219/137.31 |
| 4,608,482 | 8/1986 | Cox et al. ............ | 219/132 |
| 4,731,518 | 3/1988 | Parmelee et al. ...... | 219/137.31 |
| 4,864,099 | 9/1989 | Cusick, III et al. ... | 219/137.62 |
| 4,916,270 | 4/1990 | West .................. | 219/137.31 |
| 4,962,396 | 10/1990 | Kokubun ............. | 352/174 |
| 5,136,130 | 8/1992 | Daly .................. | 200/318.1 |
| 5,541,379 | 7/1996 | Kim ................... | 200/566 |
| 5,577,600 | 11/1996 | Schoene et al. ....... | 200/43.17 |
| 5,638,945 | 6/1997 | Fukimuki et al. ..... | 200/43.17 |
| 5,698,122 | 12/1997 | Lubieniecki .......... | 219/137.31 |

*Primary Examiner*—Patrick Ryan
*Assistant Examiner*—Anjan Dey
*Attorney, Agent, or Firm*—Thomas W. Buckman; Mark W. Croll; John P. O'Brien

[57] ABSTRACT

A mig welding gun has a handle with a longitudinal centerline and a hole with an axis transverse to the centerline. A trigger is received in the handle for rotation about an axis perpendicular to and offset from the hole axis. A spring biases the trigger to a released position whereat the gun is off. Applying a squeeze force to the trigger rotates it to a depressed position whereat the gun is on. A pin is slidable in the trigger to engage the handle hole when the trigger is in the depressed position. Removing the squeeze force while the pin engages the handle hole locks the trigger in the depressed position. Momentarily reapplying the squeeze force to the trigger causes the pin to disengage from the handle hole and enable the trigger to return to the released position. In a modified embodiment, the pin is engageable with a chap inside the hole.

18 Claims, 3 Drawing Sheets

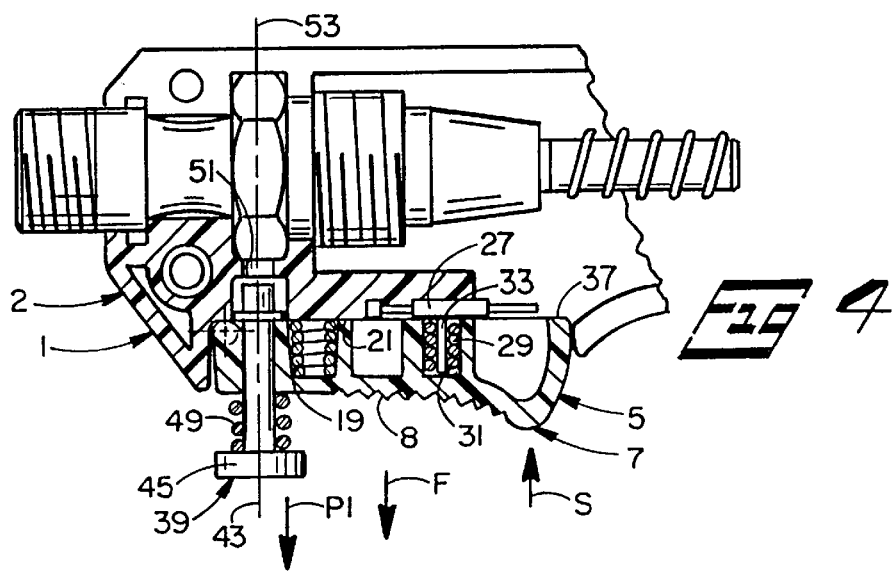
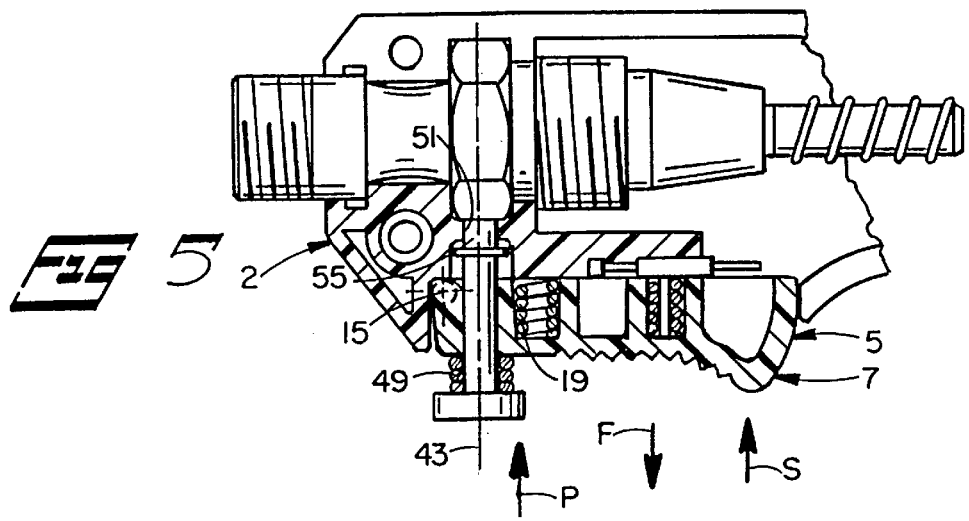
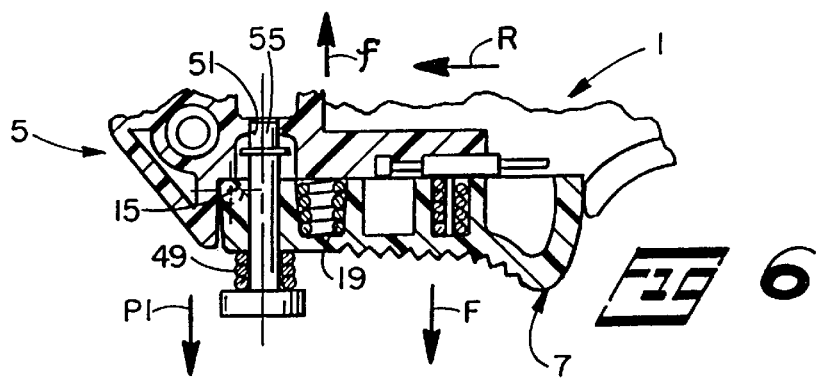

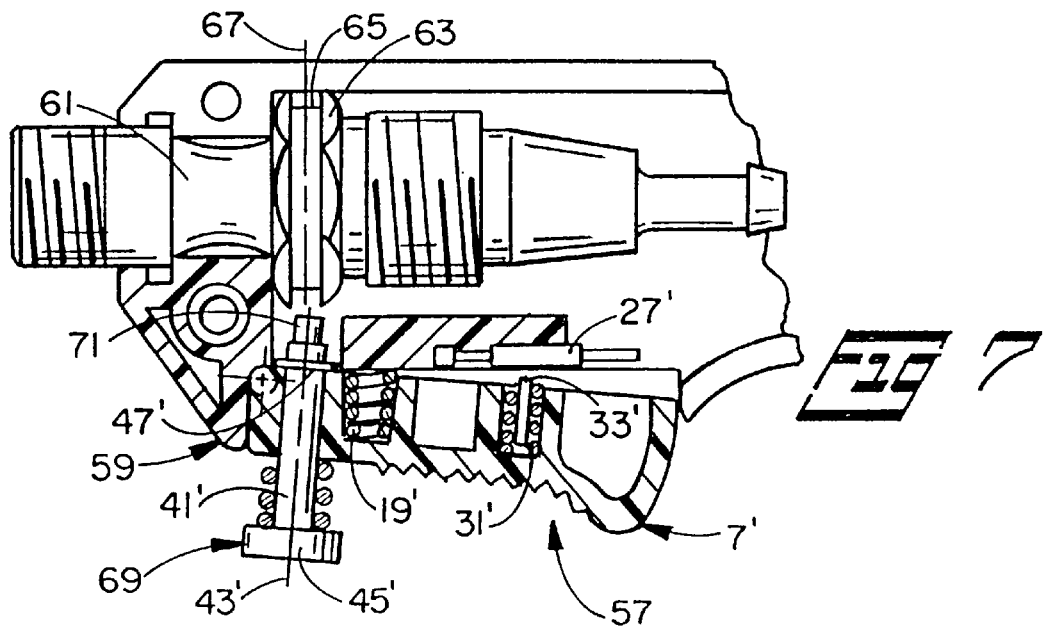
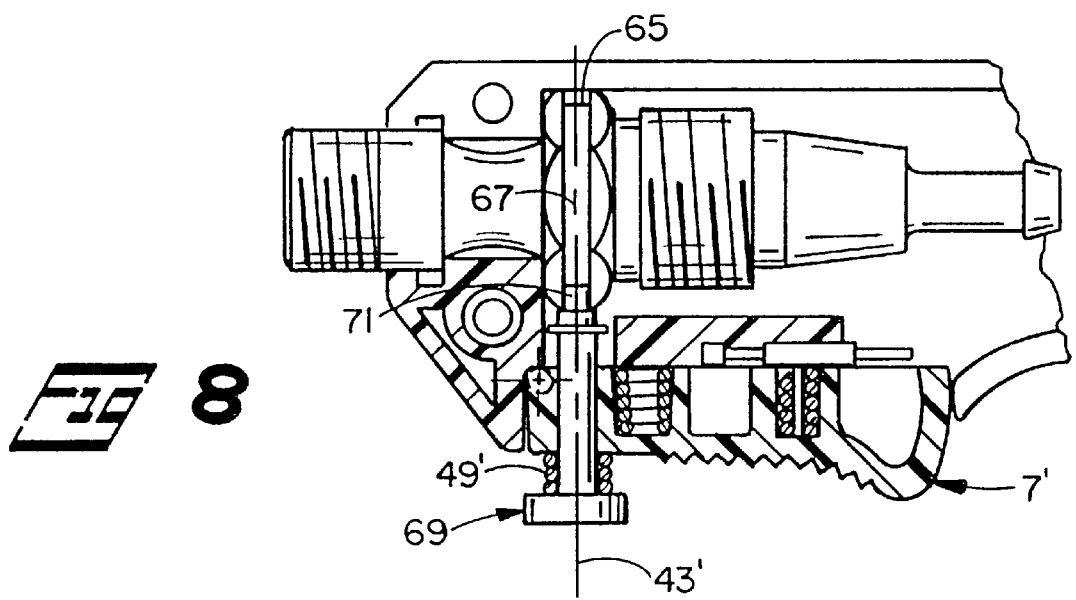

TRIGGER LOCKING PIN MECHANISM FOR MIG GUN

BACKGROUND OF THE INVENTION

1. Field of the Invention

This invention pertains to controls for welding machines, and more particularly to manual controls on the guns of wire welding machines.

2. Description of the Prior Art

Various types of controls have been built into the guns of GMAW or mig welding machines. The purpose of the control is to regulate the welding process, such as the advancement of the weld wire to the workpiece. The control can also be used to adjust the welding voltage. Typically, the control is in the form of a manually operated switch. U.S. Pat. No. 4,608,482 shows a welding system switch that regulates both weld wire feeding and welding voltage by a single adjustment.

Trigger type control switches have been used on wire welding machine guns. An example of a trigger switch may be seen in U.S. Pat. No. 4,250,366. U.S. Pat. No. 5,698,122 shows a welding machine gun with a three-position switch lever. The switch mechanisms of the U.S. Pat. Nos. 4,250,366 and 5,698,122 patents include sliding elements that hold the switch at a locked on position.

The prior gun switches with the sliding elements work quite well and have proven satisfactory. Nevertheless, there is room for improvement to them.

SUMMARY OF THE INVENTION

In accordance with the present invention, a trigger locking pin mechanism is provided that conveniently controls the mig welding process from a welding machine gun. This is accomplished by apparatus that includes a pin passing through a trigger and selectively engaging a reaction member in the gun handle.

The handle has an external contour that is easily and comfortably grasped by a person's hand. One end of the trigger is hinged to the handle for rotation about a transverse axis. Squeezing the trigger depresses it against a trigger spring. The trigger has a pair of plungers that contact electrical terminals in the handle and close an electrical circuit when the trigger is depressed. Removing the squeeze force on the trigger enables the trigger spring to return the trigger to its released position and break the electrical circuit.

The pin is captured in the trigger for sliding along a straight axis offset from and perpendicular to the trigger axis of rotation. A pin spring biases the pin out of the trigger. One end of the pin is outside of the trigger in a location where it is contactable by the person's finger when he grasps the gun.

According to one aspect of the invention, the handle reaction member is a hole in the gun handle that is transverse to the trigger axis of rotation. When the trigger is depressed, the pin axis is concentric with the hole in the handle. In that situation, the person can push the pin against the pin spring such that the pin second end enters the hole in the handle. Removing the trigger squeeze force while momentarily continuing to push the pin causes the trigger spring to rotate the trigger slightly toward its released position. The slight rotation of the trigger causes the pin second end to contact the side of the hole in the handle, which exerts a reaction force against the pin. After the pin pushing force is removed, friction between the pin second end and the handle hole maintains engagement of the pin second end with the hole, and thus maintains the trigger in its depressed position, even though the pin spring biases the pin out of the handle hole.

When it is desired to release the trigger, it is depressed fully against the trigger spring. That action realigns the pin axis and the hole in the handle and removes the friction between the pin and the hole. The pin spring then slides the pin out of engagement with the hole in the handle. Finally, removing the squeeze force on the trigger enables the trigger spring to rotate the trigger to its released position.

In an alternate embodiment of the invention, the pin second end has an extension on it. The pin extension is long enough to reach a circumferencial groove in the gun chap. When the trigger is in its released position, the pin extension is out of and is misaligned with the chap groove. When the trigger is depressed, the pin can be pushed into the trigger such that the pin extension engages the chap groove. Removing the squeeze force on the trigger while momentarily pushing the pin causes the trigger to rotate slightly toward its released position. The pin extension then contacts a side of the chap groove, which exerts a reaction force against the pin. The pin remains engaged with the chap groove by friction against the bias of the pin spring. The engagement of the pin extension in the chap groove maintains the trigger in its depressed position. A slight squeeze force on the trigger is sufficient to realign the pin with the chap groove and remove the friction between them. The pin spring then slides the pin out of engagement with the chap groove. Removing the squeeze force on the trigger enables the trigger spring to return the trigger to its released position.

Other advantages, benefits, and features of the present invention will become apparent to those skilled in the art upon reading the detailed description of the invention.

BRIEF DESCRIPTION OF THE DRAWINGS

FIG. 4 is a view similar to FIG. 2, but showing the trigger in the depressed position and the pin in the disengaged position.

FIG. 5 is a view similar to FIG. 4, but showing the pin in the engaged position.

FIG. 6 is a view similar to FIG. 5, but showing the squeeze force removed from the trigger.

FIG. 7 is a longitudinal cross sectional view of a modified embodiment of the invention showing the trigger in the released position.

FIG. 8 is a view similar to FIG. 7, but showing the trigger in the depressed position.

DETAILED DESCRIPTION OF THE INVENTION

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Figure 1:
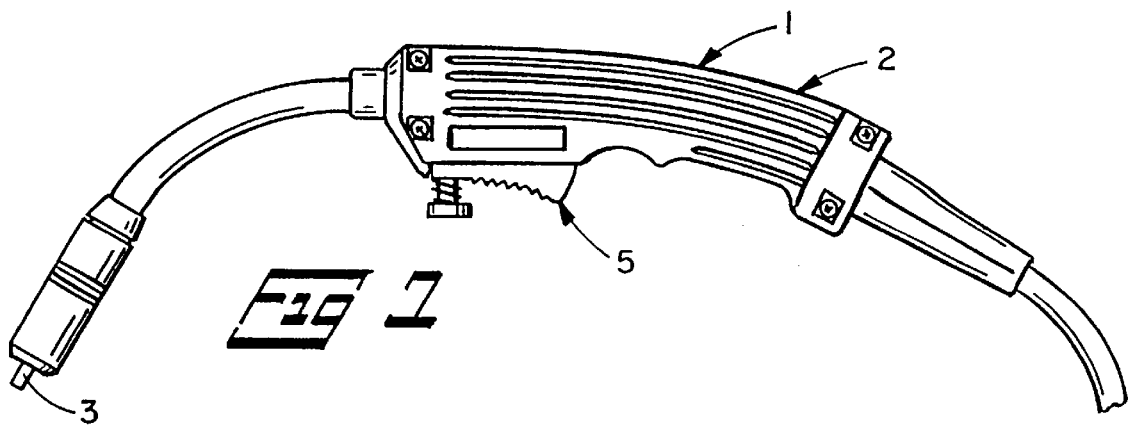
FIG. 1 is a front view of a gun for a wire welding machine that includes the present invention.
Figure 2:
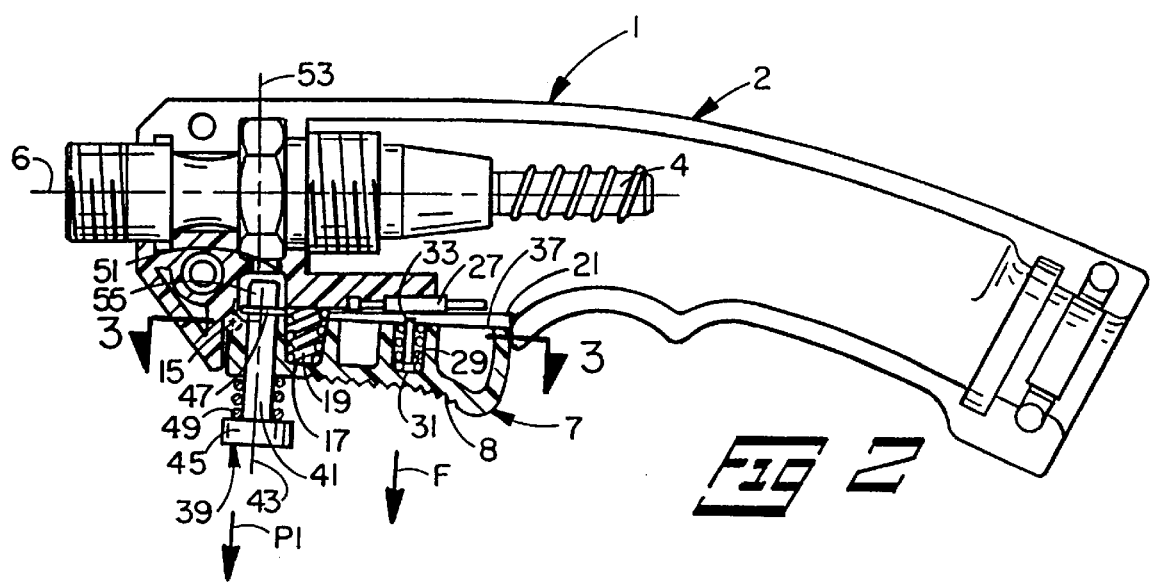
FIG. 2 is a longitudinal cross sectional view of the trigger locking pin mechanism of the present invention with the trigger in the released position.

Referring to FIGS. 1 and 2, a gun 1 for a mig wire welding machine (not shown) is illustrated that includes the present invention. The gun 1 has a handle 2 that is grasped by a welding machine operator during the welding operation to direct a weld wire 3 to a workpiece. Inside the handle 2 is a brass chap 4. The handle and the chap 4 extend along a longitudinal centerline 6. The gun handle is fabricated with a hole 51 that defines a longitudinal axis 53. The hole axis 53 is transverse to the handle centerline 6.

In accordance with the present invention, the welding process is controlled by a trigger locking pin mechanism 5 in the gun 1. The trigger locking pin mechanism 5 enables the welding process to be turned on, locked on, and turned off by the use of two fingers of the welding machine operator.

Figure 3:
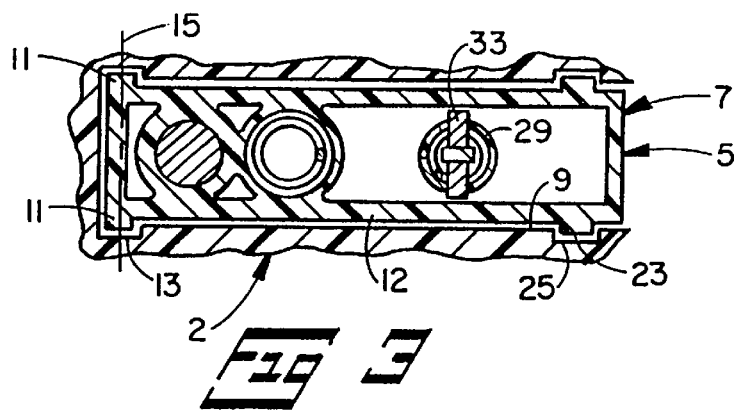
FIG. 3 is a cross sectional view taken on an enlarged scale along line 3—3 of FIG. 2.

Also looking at FIG. 3, the trigger locking pin mechanism 5 is comprised of a trigger 7 that fits in a recess 9 of the gun handle 2. The trigger 7 has a serrated outer surface 8 and a flat inner surface 37. A pair of opposed cylindrical stubs 11 extend outwardly from side walls 12 of the trigger. The stubs 11 are rotatably received in corresponding sockets 13 in the gun handle. The trigger is thus rotatable about a trigger axis 15.

The trigger 7 is further formed with a first recess 17 that holds a trigger spring 19. The trigger spring 19 acts against a flat surface 21 of the gun handle 2 and exerts a force F on the trigger. The force F biases the trigger in a clockwise direction with respect to FIG. 2 toward a released position of the trigger. Rotation of the trigger in the clockwise direction is limited by a pair of lips 23 on the side walls 12 that fit loosely within grooves 25 in the handle. The lips 23 abut ends of the grooves 25 to set the released position of the trigger, as is shown in FIG. 2.

A pair of electrical terminals 27 are embedded side-by-side in the handle 2. The terminals 27 connect with wires, not shown, that are part of the welding machine control circuit. The trigger 7 has a second recess 29 that holds a plunger spring 31. A pair of plungers 33 are captured for limited reciprocation in the recess 29. Each plunger 33 is aligned with a respective terminal. The plunger spring 31 biases the plungers outwardly from the recess 29 such that the plunger ends 35 protrude beyond the trigger inside surface 37 when the trigger is in its released position of FIG. 2. However, the plungers do not contact the terminals when the trigger is in its released position. The trigger locking pin mechanism 5 is then in an off condition.

The trigger locking pin mechanism 5 further comprises a pin 39 having a shank 41 that passes through the trigger 7. The pin 39 defines a straight axis 43 that is perpendicular to and offset from the trigger axis of rotation 15. The pin axis 43 is also preferably perpendicular to and intersects the handle longitudinal centerline 6. The pin is captured in the trigger by a knob 45 and a snap ring 47. A pin spring 49 between the trigger surface 8 and the pin head 45 exerts a force P1 on the pin. When the trigger locking pin mechanism is in the off condition of FIG. 2, the pin axis 43 is misaligned with the axis 53 of the handle hole 51. Should the welding machine operator then push on the pin 39, its end 55 would merely strike the handle material adjacent the hole 51.

Now turning to FIG. 4, the trigger locking pin mechanism 5 is shown in an on condition. The on condition is achieved by grasping the handle 2 and squeezing the trigger outer surface 8 with a force S. The handle is normally grasped such that the operator's middle finger is in contact with the trigger surface 8 and the forefinger is on the pin knob 45. Thus, the squeeze force S on the trigger is normally accomplished with the middle finger of the operator's hand. The force S overcomes the trigger spring force F and rotates the trigger 7 in a counterclockwise direction with respect to FIG. 4 until the trigger surface 37 strikes the handle surface 21. When the trigger is in the depressed position of FIG. 4, the plungers 33 make contact with the corresponding terminals 27, and the plungers are pushed into the recess 29 against the plunger spring 31. Contact between the plungers and the terminals close a circuit that turns the welding gun 1 on. The plunger spring assures that the plungers maintain firm contact with the terminals. Releasing the squeeze force S on the trigger will result in the trigger locking pin mechanism returning to the off condition of FIG. 2 under the force F of the trigger spring 19.

When the trigger 7 is in the depressed position of FIG. 4, the axis 43 of the pin 39 is concentric with the axis 53 of the handle hole 51. The operator can then push the pin 39 with his forefinger with a force P that overcomes the force Pi of the pin spring 49, FIG. 5. The pin slides along the axis 43, and the pin end 55 engages the hole 51 in the handle 2. At that point, the force P can be removed, if desired, while maintaining the squeeze force S. Doing so enables the pin spring to disengage the pin from the hole, thereby returning the trigger locking mechanism 5 to the condition of FIG. 4.

With the trigger locking pin mechanism 5 in the on condition of FIG. 5, the squeeze force S on the trigger 7 can be removed while momentarily maintaining the pin force P. The trigger spring 19 continues to exert the force F and tend to rotate the trigger clockwise about the axis of rotation 15 toward the off condition of FIG. 2. However, the trigger is able to rotate only very slightly through the clearance between the pin end 55 and the side of the handle hole 51. Further clockwise rotation of the trigger is prevented by the reaction force R exerted on the pin end by the handle hole, FIG. 6. At that point, the operator can release the force P on the pin. The pin spring 49 urges the pin to slide back to its disengaged location of FIG. 4. However, the reaction force R between the pin end 55 and the handle hole 51 sets up a friction force f that prevents pin disengagement from the handle hole. The result is that the trigger locking pin mechanism 5 remains locked in the on condition.

To turn the gun 1 off from the locked on condition of FIG. 6, it is necessary only to apply a momentary squeeze force S to the trigger 7. That force S removes the reaction force R and also the friction force f acting on the pin end 55. The pin spring 49 is then able to disengage the pin end from the handle hole 51 and place the trigger locking pin mechanism back to the on condition of FIG. 4. Then removing the squeeze force S returns the trigger locking pin mechanism to the off condition of FIG. 2.

A modified trigger locking pin mechanism 57 is disclosed in FIGS. 7 and 8. The modified trigger locking pin mechanism 57 is used with a handle 59 and a chap 61. A hex portion 63 of the chap 61 has a circumferencial groove 65 that is centered on a transverse plane 67. Terminals 27' are embedded side-by-side in the handle 59. The trigger locking pin mechanism 57 comprises a trigger 7', trigger spring 19', plungers 33', and a plunger spring 31'. A pin 69 is captured in the trigger 7' by means of a knob 45' and a snap ring 47'. The pin 69 has a shank 41' with a longitudinal axis 43'. The pin is slidable in a hole that passes through the trigger 7'. The end of the pin has an extension 71.

FIG. 7 shows the trigger locking pin mechanism 57 in the off condition, analogous to the off condition of the trigger locking pin mechanism 5 of FIG. 2. When the trigger locking pin mechanism 57 is in the off condition, the pin axis 43' does not lie in the plane 67 of the chap groove 65. Accordingly, pushing the pin has no effect on the trigger locking pin mechanism.

In FIG. 8, the trigger 7' has been rotated to its depressed position. In that situation, the pin axis 43' lies in the plane 67 of the chap groove 65. The welding machine operator can then push the pin 69 against the pin spring 49' such that the pin extension 71 enters the chap groove 65. The trigger pin locking mechanism 57 is then in an on condition analogous to the on condition of the trigger locking pin mechanism 5 as shown in FIG. 5. The operator can then release the trigger 7' while momentarily continuing to apply the push force on the pin 69. The trigger spring 19' will cause the trigger to rotate slightly toward its released position of FIG. 7 and thereby cause the pin extension 71 to engage the side of the chap groove 65. Subsequent removal of the push force on the pin will lock the trigger locking pin mechanism 57 in the on condition in a manner substantially similar to the condition of FIG. 6 of the trigger locking pin mechanism 5.

Thus, it is apparent that there has been provided, in accordance with the invention, a trigger locking pin mechanism for a mig gun that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. A trigger locking pin mechanism for a welding mig gun comprising:
   a. a handle defining a longitudinal centerline and having a hole therein that defines a straight first axis;
   b. a trigger received in the handle for rotating between depressed and released positions about a second axis perpendicular to and offset from the first axis;
   c. means for continuously biasing the trigger toward the released position thereof;
   d. contact means for turning the gun to on and off conditions in response to the trigger rotating to the depressed and released positions, respectively; and
   e. pin means for selectively sliding through the trigger along a third axis between engagement with and disengagement from the hole in the handle when the trigger is in the depressed position thereof.

2. The trigger locking pin mechanism of claim 1 wherein:
   a. the first axis is generally transverse to the handle centerline; and
   b. the second axis is mutually perpendicular to the handle centerline and the first axis.

3. The trigger locking pin mechanism of claim 1 wherein the third axis is misaligned with the first axis when the trigger is in the released position thereof such that the pin is not engageable with the hole in the handle, and wherein the third axis is concentric with the first axis when the trigger is in the depressed position thereof to thereby enable the pin to engage the hole in the handle.

4. The trigger locking pin mechanism of claim 1 wherein:
   a. the trigger rotates to the depressed position thereof in response to a squeeze force being applied to the trigger; and
   b. the pin locks the trigger in the depressed position thereof when the pin engages the hole in the handle and the squeeze force is removed from the trigger.

5. The trigger locking-sin mechanism of claim 1 further comprising means for biasing the pin out of engagement with the hole in the handle.

6. The trigger locking pin mechanism of claim 1 wherein:
   a. the trigger rotates to the depressed position thereof in response to a squeeze force being applied to the trigger;
   b. the pin locks the trigger in the depressed position thereof when the pin engages the hole in the handle and the squeeze force is removed from the trigger; and
   c. the pin disengages from the hole in the handle and thereby unlocks the trigger from the depressed position thereof in response to the squeeze force being reapplied to the trigger.

7. The trigger locking pin mechanism of claim 2 wherein:
   a. the means for biasing the trigger comprises a trigger spring located at a predetermined distance from the second axis and producing a force along the fourth axis parallel to the third axis that biases the trigger toward the released position thereof; and
   b. the third axis is located between the trigger second axis and the fourth axis.

8. A mig gun for controlling a welding process comprising:
   a. a handle graspable by a person's hand and defining a longitudinal centerline;
   b. a trigger received in the handle for rotating about a trigger axis of rotation between a depressed position whereat the mig gun is on and a released position whereat the mig gun is off;
   c. means for continuously biasing the trigger toward the released position thereof;
   d. a reaction member in the handle; and
   e. a pin selectively slidable in the trigger along a straight pin axis between engagement with and disengagement from the reaction member, the trigger being lockable in the depressed position thereof when the pin engages the reaction member.

9. The mig gun of claim 8 wherein the reaction member is a chap having a groove, the pin engaging the chap groove to lock the trigger in the depressed position thereof.

10. The mig gun of claim 9 wherein:
    a. the chap groove is centered on a plane generally transverse to the handle longitudinal centerline;
    b. the pin defines a straight pin axis that is misaligned with the chap groove plane when the trigger is in the released position such that the pin is not engageable with the chap groove; and
    c. the pin axis lies in the plane of the chap groove when the trigger is in the depressed position thereof such that the pin is engageable with the chap groove.

11. The mig gun of claim 8 wherein the reaction member is a hole in the handle having a straight hole axis concentric with the pin axis when the trigger is in the depressed position thereof, the trigger being lockable in the recessed position thereof when the pin engages the hole in the handle.

12. The mig gun of claim 8 further comprising means for biasing the pin out of engagement with the reaction member.

13. The mig gun of claim 12 wherein:
    a. the trigger rotates to the depressed position thereof in response to a squeeze force being applied to the trigger;
    b. the pin locks the trigger in the depressed position thereof when the pin engages the reaction member and the squeeze force is removed from the trigger; and
    c. the pin disengages from the reaction member and unlocks the trigger from the depressed position thereof in response to the squeeze force being reapplied to the trigger.

14. The mig gun of claim 8 wherein:
a. the reaction member is a hole in the handle that defines a straight hole axis that is transverse to the handle longitudinal centerline;
b. the pin defines a pin axis that is misaligned with the hole axis when the trigger is in the released position thereof such that the pin is not engageable with the hole; and
c. the pin axis is concentric with the hole axis when the trigger is in the depressed position thereof such that the pin is engageable with the hole.

15. A method of controlling a mig welding gun comprising the steps of:
a. providing a handle that defines a longitudinal centerline and including a chap;
b. mounting a trigger for rotation in the handle;
c. continuously producing a force that biases the trigger to rotate toward a released position whereat the gun is in an off condition;
d. applying a squeeze force to the trigger and rotating the trigger to a depressed position whereat the gun is in an on condition;
e. sliding a pin along a straight pin axis within the trigger into engagement with a reaction member in the handle;
f. removing the squeeze force from the trigger; and
g. exerting a reaction force on the pin by the reaction member such that the trigger is prevented from rotating to the released position thereof and thereby locking the gun in the on condition.

16. The method of claim 15 wherein:
a. the step of biasing the trigger to rotate toward a released position comprises the step of misaligning a pin axis with the reaction member when the trigger is in the released position thereof and thereby preventing the pin from sliding along the pin axis into engagement with the reaction member; and
b. the step of rotating the trigger to a depressed position comprises the step of aligning the pin axis with the reaction member and thereby enabling the pin to slide along the pin axis and engaging the reaction member.

17. The method of claim 15 wherein the step of sliding the pin into engagement with a reaction member comprises the step of sliding the pin into engagement with a hole in the handle.

18. The method of claim 15 wherein the step of sliding the pin into engagement with a reaction member comprises the step of sliding the pin into engagement with the chap.

\* \* \* \* \*